(12) United States Patent
Wood et al.

(10) Patent No.: US 11,930,806 B2
(45) Date of Patent: *Mar. 19, 2024

(54) SELF-RIGHTING, KEEL-FREE DUCK DECOY AND ANCHOR SYSTEM FOR A DUCK DECOY

(71) Applicant: ICON OUTDOORS, LLC, Olive Branch, MS (US)

(72) Inventors: Michael T. Wood, Eads, TN (US); James L Spence, Dyersburg, TN (US)

(73) Assignee: Icon Outdoors, LLC, Olive Branch, MS (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/513,019

(22) Filed: Oct. 28, 2021

(65) Prior Publication Data
US 2022/0125038 A1      Apr. 28, 2022

Related U.S. Application Data

(60) Provisional application No. 63/106,605, filed on Oct. 28, 2020.

(51) Int. Cl.
*A01M 31/06*      (2006.01)

(52) U.S. Cl.
CPC .................................. *A01M 31/06* (2013.01)

(58) Field of Classification Search
CPC ..................................................... A01M 31/06
See application file for complete search history.

(56) References Cited

U.S. PATENT DOCUMENTS

| | | | | |
|---|---|---|---|---|
| 395,612 A * | 1/1889 | Curlin | ................... | A01M 31/06 43/3 |
| 470,564 A * | 3/1892 | Lund | ..................... | A01M 31/06 43/3 |
| 722,682 A * | 3/1903 | Dills | ..................... | A01M 31/06 43/3 |
| 892,528 A * | 7/1908 | Kricke | .................. | A01M 31/06 119/713 |
| 1,183,567 A * | 5/1916 | Johnson | ................ | A01M 31/06 43/3 |
| 1,887,491 A * | 11/1932 | Johnson | ................ | A01M 31/06 24/3.13 |
| 2,247,450 A * | 7/1941 | Olsen | .................... | A01M 31/06 43/3 |
| 2,368,834 A | 2/1945 | Higgins | | |
| 2,589,913 A * | 3/1952 | Wenner | ................. | A01M 31/06 114/294 |
| 2,678,778 A * | 5/1954 | Gibson | ................. | A01M 31/06 242/405.1 |
| 2,747,814 A * | 5/1956 | Taylor | ................... | A01M 31/06 242/379.2 |

(Continued)

*Primary Examiner* — Jessica B Wong
(74) *Attorney, Agent, or Firm* — Warren D. Schickli; Stites & Harbison PLLC

(57) ABSTRACT

An anchor system for a duck decoy includes a pendulum weight, a connector adapted to connect the pendulum weight to the duck decoy, an anchor weight and a decoy cord connected between the pendulum weight and the anchor weight. A self-righting, keel-free duck decoy includes a keel-free decoy body, a pendulum weight, a connector adapted to connect the pendulum weight to the decoy body, an anchor weight and a decoy cord connected between the pendulum weight and the anchor weight.

14 Claims, 8 Drawing Sheets

(56) References Cited

U.S. PATENT DOCUMENTS

| | | | |
|---|---|---|---|
| 2,813,363 A | | 11/1957 | Leckner |
| 3,436,856 A | | 4/1969 | Miller |
| 3,733,733 A | * | 5/1973 | Ruter .................... A01M 31/06 43/43.11 |
| 3,950,879 A | | 4/1976 | Kwako |
| 4,660,313 A | * | 4/1987 | Bauernfeind ......... A01M 31/06 43/3 |
| 5,074,071 A | * | 12/1991 | Dunne .................. A01M 31/06 43/2 |
| 7,117,628 B1 | | 10/2006 | Bailey |
| 7,610,713 B1 | * | 11/2009 | Eilers .................... A01K 91/065 43/43.13 |
| 8,584,395 B2 | | 11/2013 | Tonkovich |
| 9,084,716 B1 | | 7/2015 | Bawden |
| 2007/0266614 A1 | * | 11/2007 | Cagle .................... A01M 31/06 43/3 |
| 2009/0077856 A1 | * | 3/2009 | Cagle .................... A01M 31/06 43/2 |
| 2010/0115819 A1 | * | 5/2010 | Sieman ................. A01M 31/06 114/294 |
| 2019/0075784 A1 | * | 3/2019 | Anderson ............. A01M 31/06 |
| 2020/0068873 A1 | | 3/2020 | Rhodes et al. |

\* cited by examiner

SELF-RIGHTING, KEEL-FREE DUCK DECOY AND ANCHOR SYSTEM FOR A DUCK DECOY

RELATED APPLICATIONS

This application claims priority to U.S. Provisional Patent Application Ser. No. 63/106,605, filed on Oct. 28, 2020, which is hereby incorporated by reference in its entirety.

TECHNICAL FIELD

This document relates generally to the field of waterfowl hunting and, more particularly, to a new and improved self-righting, keel-free duck decoy and a related anchor system for a duck decoy.

BACKGROUND

Many hunters today use floating duck decoys that include weighted keels so that when the decoys are thrown out into the water they are self-righting with the bottom down against the water and the head up. Such a keel is typically molded of plastic and has a compartment in the keel of the decoy that is filled with sand to act as a ballast that provides the self-righting action.

While the self-righting action of a weighted keel decoy is a significant benefit, this benefit does come at a cost. Many hunters employ a flock or raft of duck decoys when hunting. Large groups of weighted keel decoys have significant weight that is inconvenient and difficult to carry over the long distances often necessary to reach the desired water site.

The more the wind functions to push and move the decoys on the water, the more life-like they appear. Unfortunately weighted keels, which run along the bottom face of the decoy under the water, slow or impede such movement to the chagrin of the hunter. This is because when the wind blows along the surface of the water, the wind often turns the decoy so that the wind pushes the decoy from the side, substantially perpendicular to the longitudinal axis of the keel in the water. As a result, the keel creates significant drag that retards the movements of the duck decoy. This is problematic as decoy movement is one of the biggest contributors to attracting live ducks to the hunting site.

The new and improved keel-free duck decoy and the related anchor system that are the subject matter of this document advantageously allow for a duck decoy that is self-righting for ease of deployment on the water. Each duck decoy weighs less than a traditional weighted keel duck decoy so as to be easier to carry to the desired water site . . . particularly over long distances. Further, without the keel to impede movement, when on the water, the new and improved duck decoy turn quicker in response to changes in wind direction and move faster when pushed by the wind thereby providing for more life-like movement. Thus, the new and improved self-righting, keel-free duck decoy described in this document represents a significant advance in the duck decoy art.

SUMMARY

In accordance with the purposes and benefits described herein, an anchor system is provided for a duck decoy. That anchor system includes: (a) a pendulum weight, (b) a connector adapted to connect the pendulum weight to the duck decoy, (c) an anchor weight and (d) a decoy cord connected between the pendulum weight and the anchor weight.

In one or more of the many possible embodiments of the anchor system, the anchor system further includes a swivel connected between the pendulum weight and the decoy cord. In one or more of the many possible embodiments of the anchor system, the pendulum weight includes a proximal end attached to the connector and a distal end attached to the swivel. Still further, in one or more of the many possible embodiments of the anchor system, the connector is a clip adapted to allow the pendulum weight to pivot about an axis perpendicular to a longitudinal axis of the duck decoy.

In accordance with yet another aspect, a new and improved duck decoy is provided. That duck decoy comprises: (a) a decoy body, (b) a pendulum weight, (c) a connector adapted to connect the pendulum weight to the decoy body, (d) an anchor weight and (e) a decoy cord connected between the pendulum weight and the anchor weight.

In one or more of the many possible embodiments of the duck decoy, the duck decoy further includes a swivel connected between the pendulum weight and the decoy cord. In one or more of the many possible embodiments of the duck decoy, the pendulum weight includes a proximal end attached to the connector and a distal end attached to the swivel. Still further, in one or more of the many possible embodiments of the duck decoy, the connector is a clip adapted to allow the pendulum weight to pivot about an axis perpendicular to a longitudinal axis of the duck decoy.

Still further, the decoy body may include a bottom face and a bracket may be carried on the bottom face. In such an embodiment, the connector may be releasably connected or secured to the bracket. Further, the duck decoy may be keel-free to allow for enhanced, life-like movement in the wind.

In accordance with yet another aspect, a new and improved duck decoy comprises: (a) a keel-free decoy body, (b) a pendulum weight, (c) a connector adapted to connect the pendulum weight to the decoy body, (d) an anchor weight and (e) a decoy cord connected between the pendulum weight and the anchor weight.

In one or more of the many possible embodiments of the duck decoy, the duck decoy further includes a swivel connected between the pendulum weight and the decoy cord. In one or more of the many possible embodiments of the duck decoy, the pendulum weight includes a proximal end attached to the connector and a distal end attached to the swivel.

In one or more of the many possible embodiments of the duck decoy, the decoy body includes a longitudinal axis extending from a front to a rear of the decoy body and the connector is a clip adapted to allow the pendulum weight to pivot about an axis perpendicular to the longitudinal axis of the decoy.

Still further, the decoy body may include a bottom face and a bracket may be carried on the bottom face. In such an embodiment, the connector may be releasably connected or secured to the bracket.

In the following description, there are shown and described several preferred embodiments of the anchor system for a duck decoy and the duck decoy. As it should be realized, the anchor system and the duck decoy are capable of other, different embodiments and their several details are capable of modification in various, obvious aspects all without departing from the anchor system and the duck decoy as set forth and described in the following claims.

Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the anchor system and the duck decoy and together with the description serve to explain certain principles thereof.

Figure 5A:
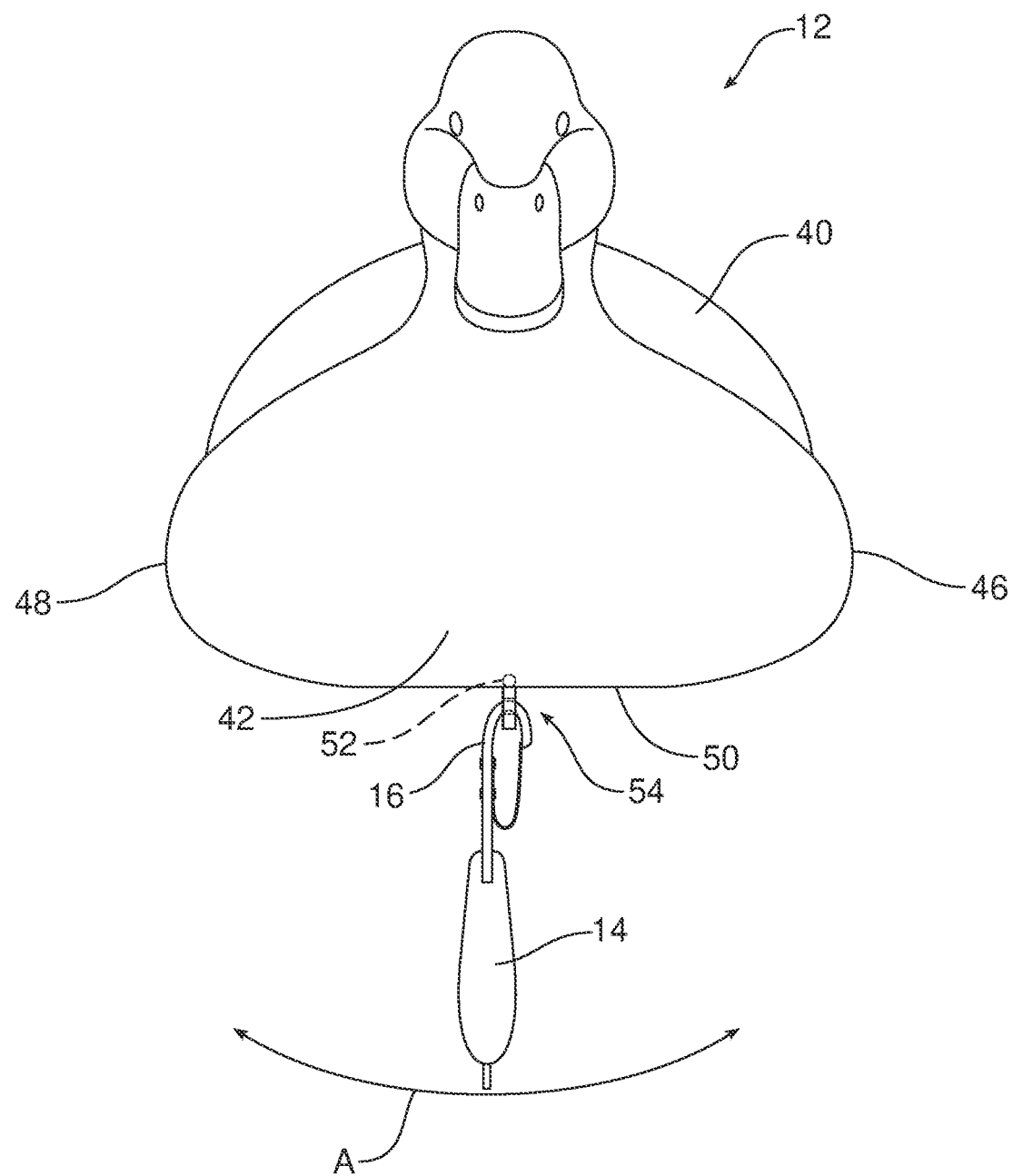
Figure 5B:
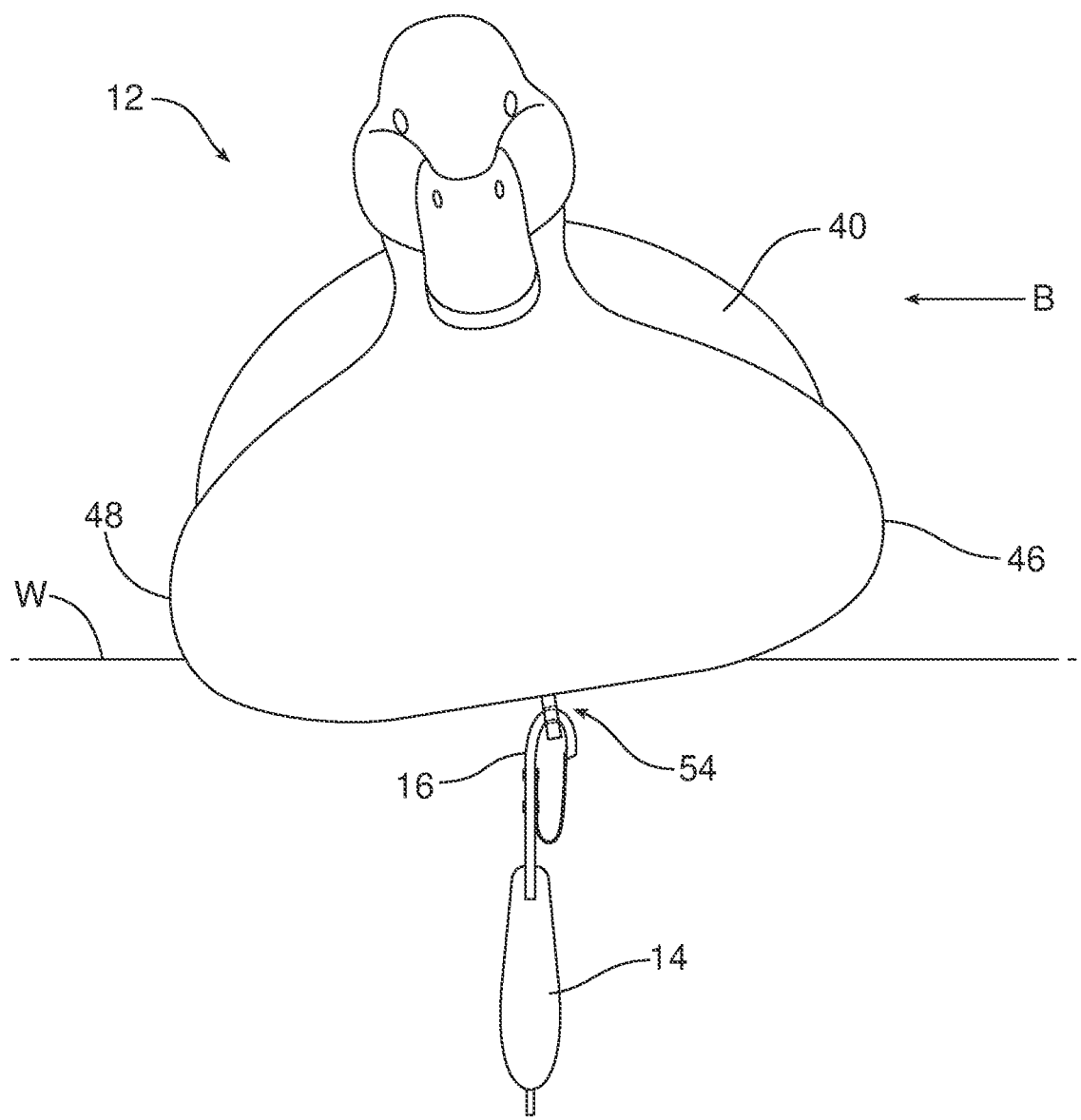
Figure 5C:
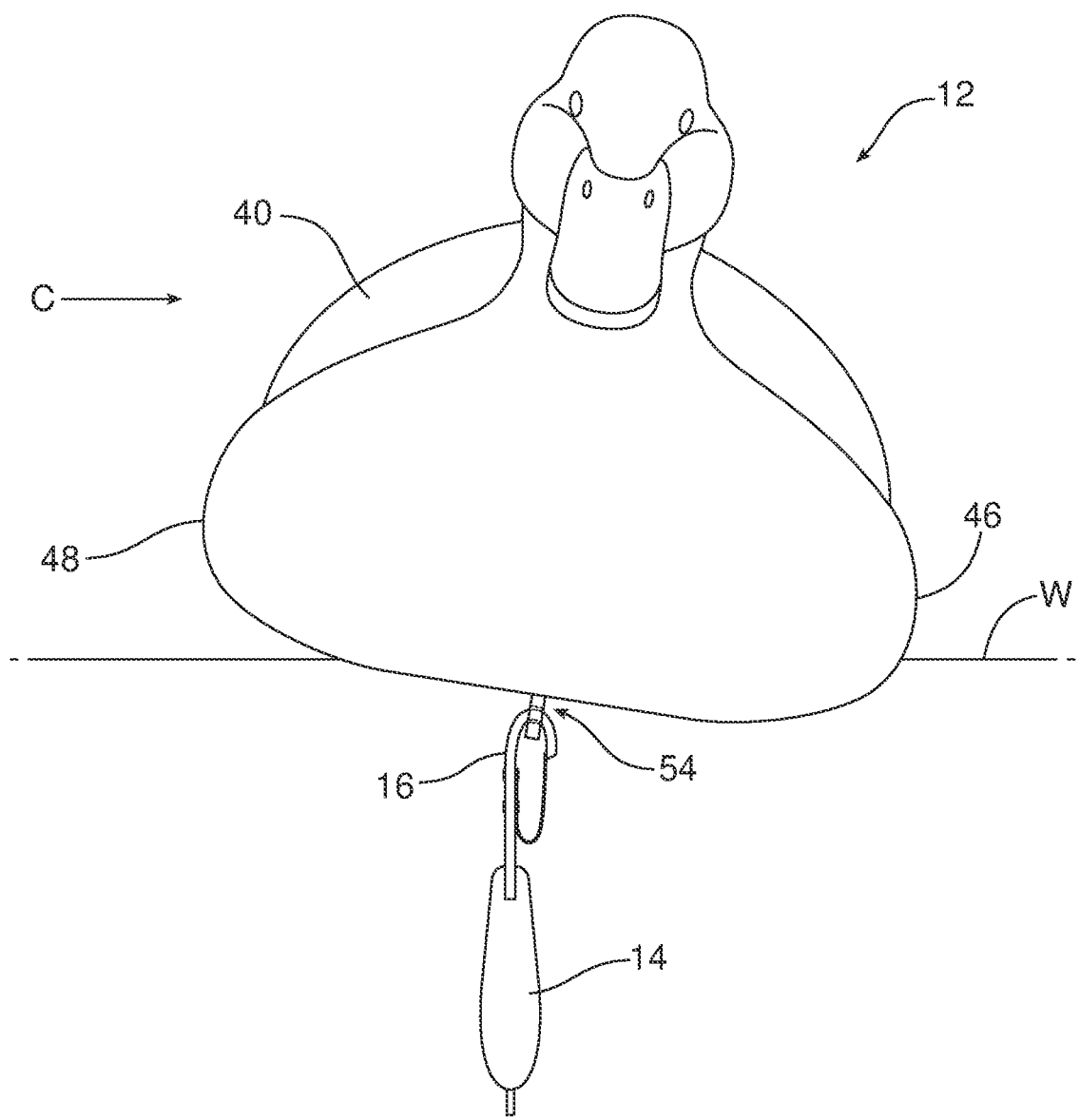

FIG. 5A is a front elevational view of the decoy body illustrating how the pendulum weight swings side-to-side in an arc perpendicular to the longitudinal axis of the decoy body. FIG. 5B is a similar view illustrating the duck decoy rocking to the left. FIG. 5C illustrates the duck decoy rocking to the right.

Figure 6:
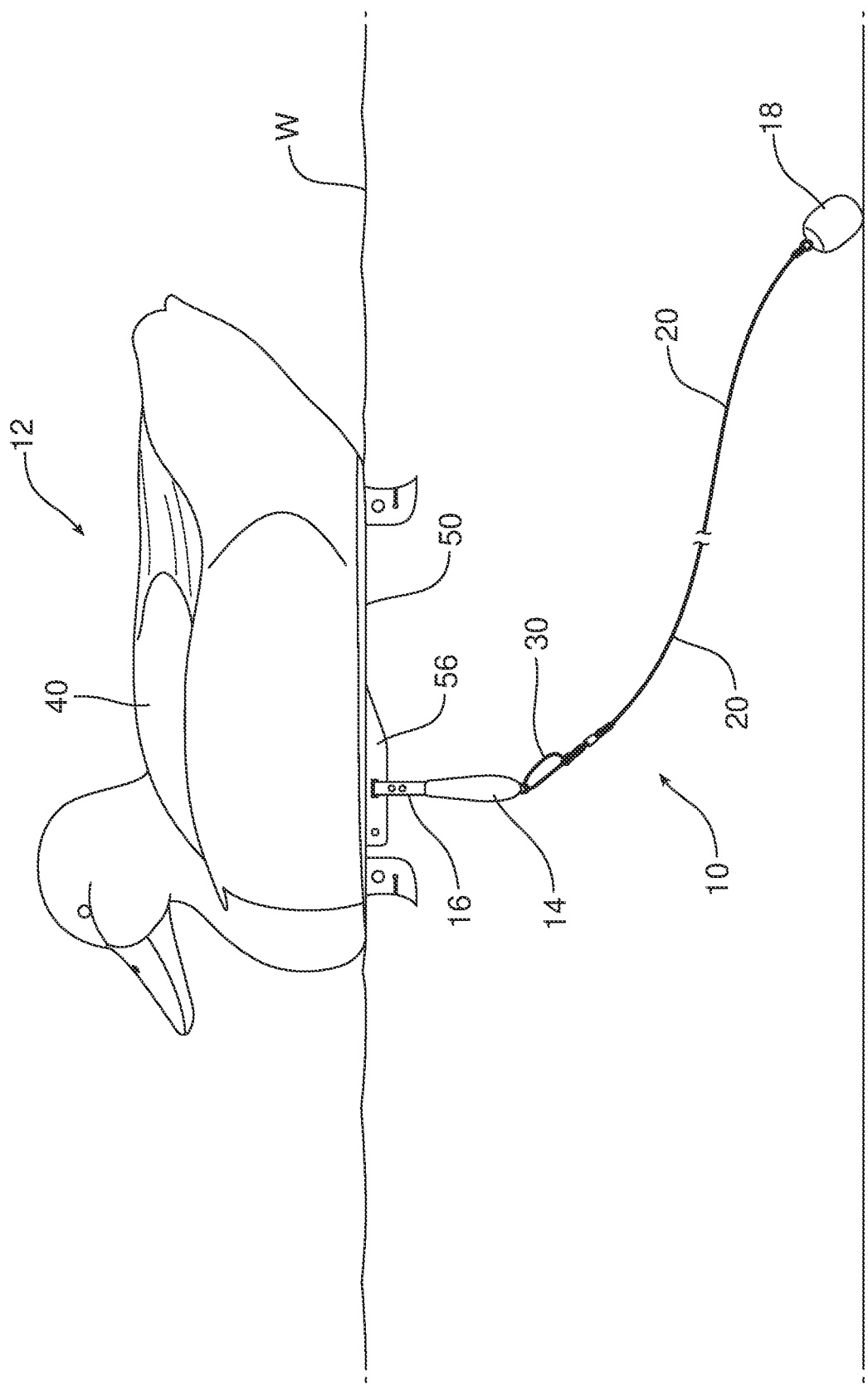

FIG. 6 is a schematic illustration of the fully rigged duck decoy on the water surface of a pond.

Reference will now be made in detail to the present preferred embodiments of the anchor system and self-righting, keel-free duck decoy, examples of which are illustrated in the accompanying drawing figures.

DETAILED DESCRIPTION

Figure 1:
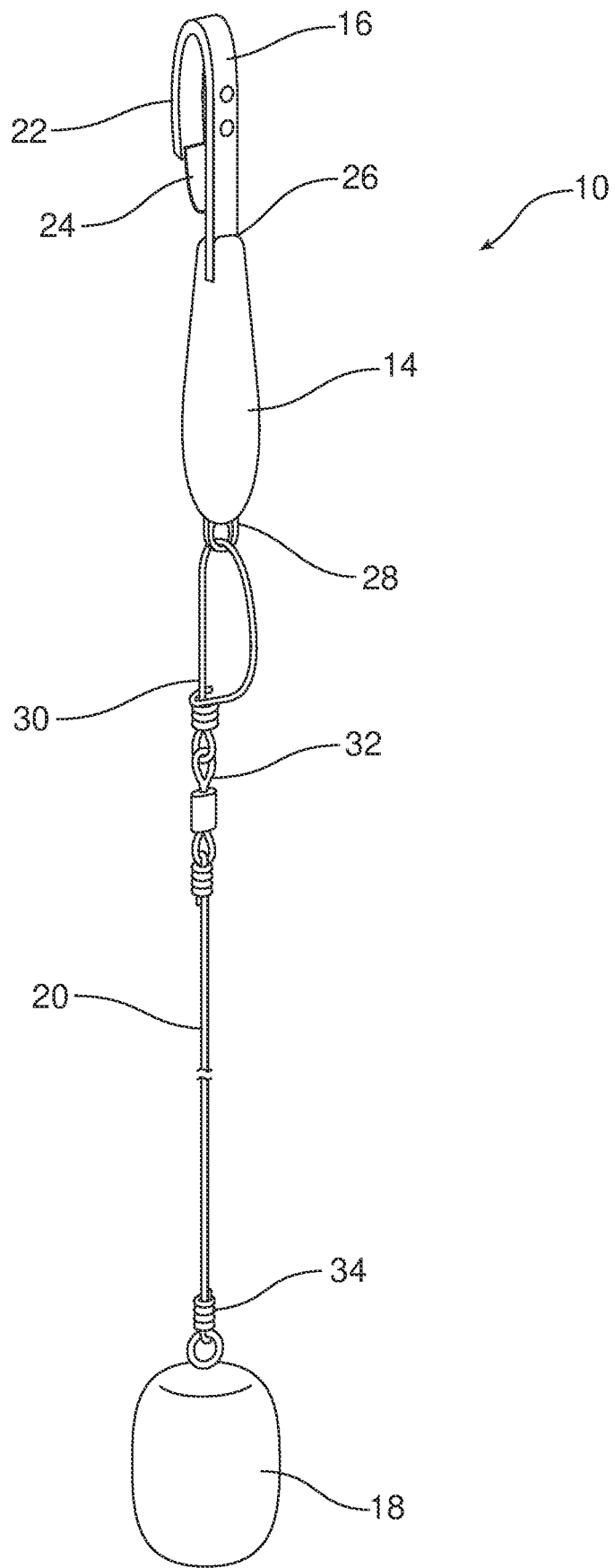
FIG. 1 is a perspective view of the new anchor system for a duck decoy including the connector or clip, the pendulum weight, the swivel, the decoy cord and the anchor weight that function to retain the decoy in a desired area as it is moved and turned on the water in a lifelike manner by the wind.
Figure 2:
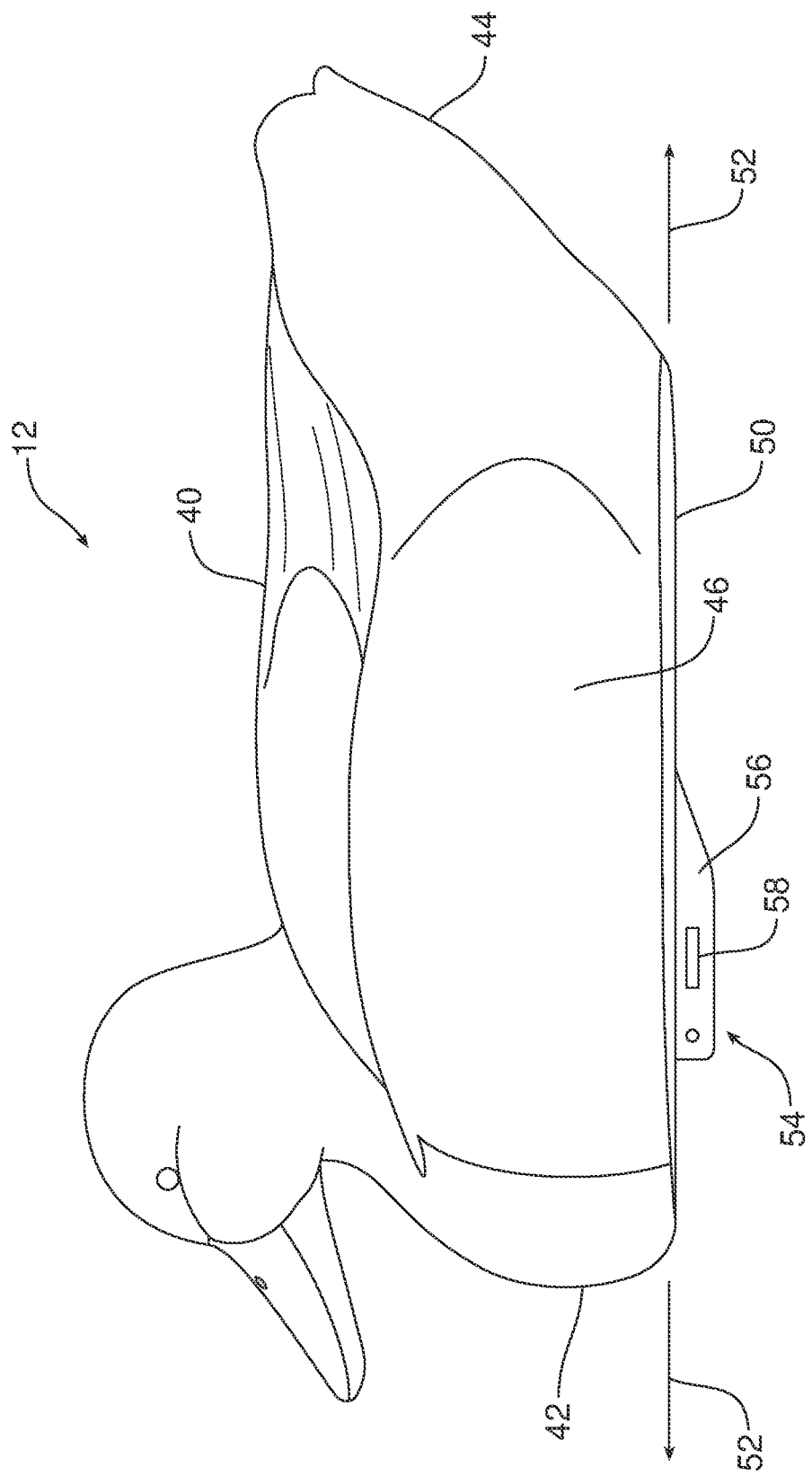
FIG. 2 is a side elevational view of a decoy body.

Reference is now made to FIGS. 1 and 2 which illustrates the new anchor system 10 for a duck decoy 12. That anchor system 10 includes a pendulum weight 14, a connector 16, an anchor weight 18 and a decoy cord 20. More particularly, the pendulum weight 14 has an elongated, teardrop shape. In the illustrated embodiment, the connector 16 is fixed to the pendulum weight 14.

Figure 3:
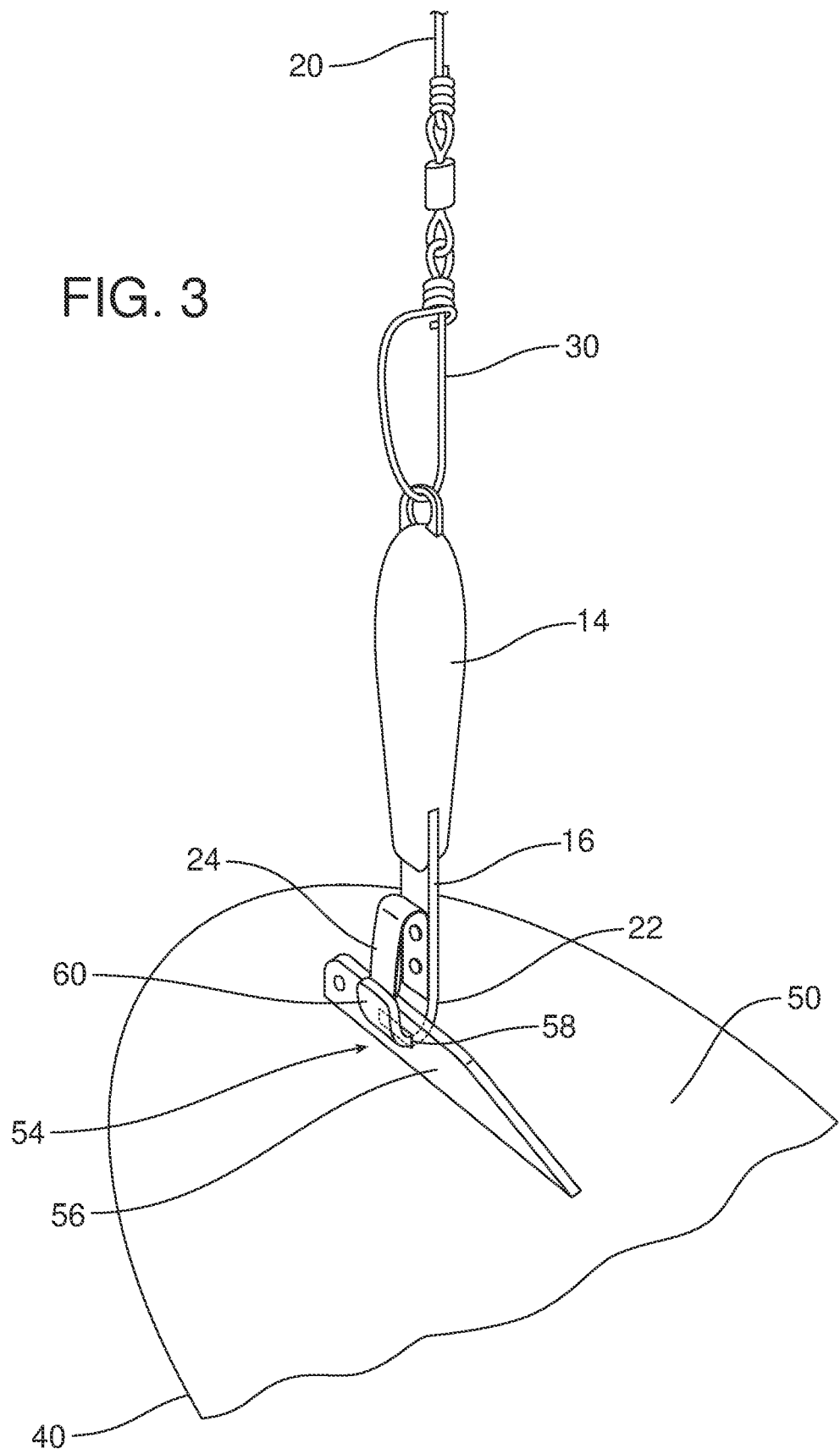
FIG. 3 is a detailed bottom perspective view of the decoy body of FIG. 2 illustrating the connection of the connector, of the anchor system illustrated in FIG. 1, to the bracket on the bottom face of the decoy body.

The connector 16 of the illustrated embodiment takes the form of a spring clip including a hook section 22 and a gate section 24. See also FIG. 3. One opens the connector/spring clip 16, in a manner known in the art, by pressing the gate section 24 toward the hook section 22 in order to connect the connector/spring clip to a duck decoy 12 as will be explained below.

The connector/spring clip 16 is attached at one end to the smaller (lighter-in-weight), proximal end 26 of the pendulum weight so that the larger (heavier-in-weight), distal end 28 of the pendulum weight 14 is spaced from the duck decoy allowing the pendulum weight to provide better self-righting action to the duck decoy so that the bottom of the decoy remains in water contact.

A swivel 30 is attached to the larger, distal end 28 of the pendulum weight 14. The decoy cord 20 includes one end 32 attached to the swivel 30 and another end 34 attached to the anchor weight 18 so that the swivel is connected between the pendulum weight 14 and the decoy cord 20. Advantageously, the swivel 30 allows the duck decoy 12 to twist and turn as the wind changes direction without causing the decoy cord 20 to become twisted and knotted.

Figure 4:
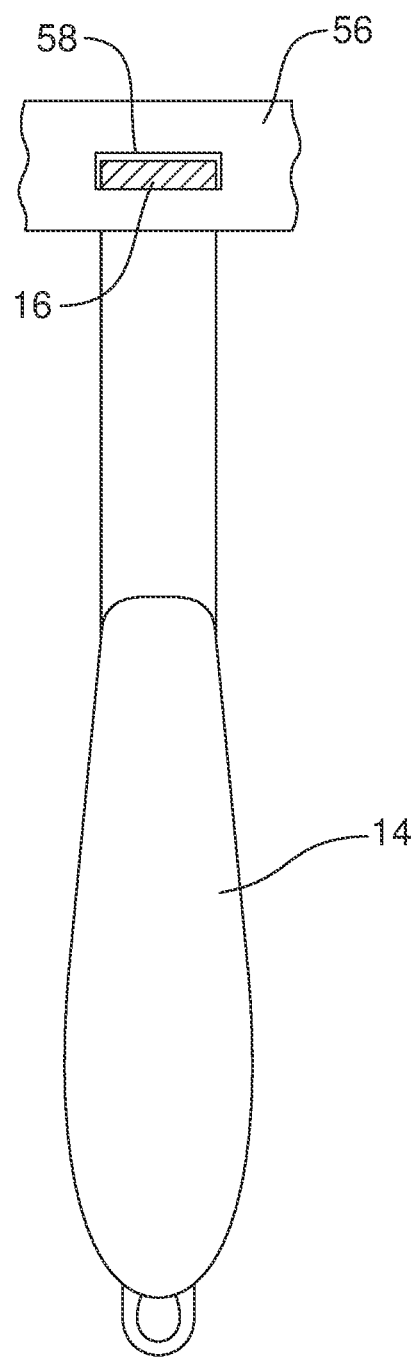
FIG. 4 is a detailed, partially cross sectional view illustrating how the connector is connected to the bracket.

Reference is now made to FIGS. 2 and 4 which illustrate the body 40 of the duck decoy 12. That body 40 includes a front end 42, a rear end 44, two opposed sides 46, 48, a bottom face 50 and a longitudinal axis 52 extending from the front end to the rear end. Here it should be noted that the duck decoy is keel-free: that is, there is no keel on the bottom face 50 extending between the front end 42 and the rear end 44.

In the illustrated embodiment, a bracket 54 is carried on and projects from the bottom face 50. The bracket 54 includes a flange 56 having an elongated slot 58 that extends along a line substantially parallel to the longitudinal axis 52 of the duck decoy body 12. The connector/spring clip 16 is connected to the bracket by depressing the gate section 24 to open the hook section 22. The connector/spring clip 16 is then held open while the end 60 of the hook section is inserted into and through the elongated slot 58 in the bracket 54. See FIG. 3. The gate section 24 is then released so that it springs back into its home position closing the hook section 22 and thereby securing the connector/spring clip 16 to the bracket and the body 40 of the duck decoy 12.

As should be appreciated from viewing FIG. 4, the connector/spring clip 16 has a width that is slightly shorter than the length of the elongated slot 58 and the connection is adapted to allow the pendulum weight 14 to swing in an arc A from side 46-to-side 48 underneath the bottom face 50 of the duck decoy 12. This arc A, illustrated in FIG. 5A, extends in a plane substantially perpendicular to the longitudinal axis 52 of the duck decoy 12 so that the pendulum weight is oriented to provide the quickest and best possible self-righting action to keep the bottom face 50 of the duck decoy 12 in the water. This is true even when the hunter tosses the duck decoy 12 out into the water for the first time after arriving at the hunting site.

The pendulum weight 14 also stabilizes the duck decoy 12 in the water W. As illustrated in FIG. 5B, when the wind strongly blows in the direction of action arrow B into the side 46 of the duck decoy 12, the duck decoy may list in the water W slightly to the left but the pendulum weight 14, swinging in the arc A toward the side 48 of the duck decoy, tends to resist this listing and keep the duck decoy upright. Similarly, as illustrated in FIG. 5C, when the wind strongly blows in the direction of action arrow C into the side 48 of the duck decoy 12, the duck decoy may list in the water W slightly to the right but the pendulum weight 14, swinging in the arc A toward the side 46 of the duck decoy, tends to resist this listing and keep the duck decoy upright.

Reference is now made to FIG. 6 showing the duck decoy 12 fully rigged with the anchor system 10. The duck decoy 12 freely moves and turns on the surface of the water W in response to the wind as there is no keel to impede such movement. As a result, a more life-like action is produced. At all times, the pendulum weight 14 is free to swing through the arc A and thereby maintain the duck decoy 12 upright with the bottom face 50 in contact with the water. The swivel 30, connected between the pendulum weight 14 and the decoy cord 18 ensures that the decoy cord is not twisted and knotted as a result of the turning movement of the duck decoy 12 in response to changes in wind direction. Finally, the anchor weight 18 sits on the bottom B of the pond P to hold the duck decoy 12 in the area encompassed by the length of the decoy cord 20.

Each of the following terms written in singular grammatical form: "a", "an", and the", as used herein, means "at least one", or "one or more". Use of the phrase "One or more"

herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

Terms of approximation, such as the terms about, substantially, approximately, etc., as used herein, refers to ±10% of the stated numerical value. Use of the terms concentric, parallel or perpendicular are meant to mean approximately meeting this condition, unless otherwise specified.

It is to be fully understood that certain aspects, characteristics, and features, of the anchor system and the self-righting, keel-free duck decoy, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the anchor system and the self-righting, keel-free duck decoy which are illustratively described and presented in combination or sub-combination in the context or format of a single embodiment may also be illustratively described and presented in the context or format of a plurality of separate embodiments.

Although the anchor system and the self-righting, keel-free duck decoy of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. An anchor system for a duck decoy, comprising:
   a monolithic pendulum weight;
   a connector configured to connect the pendulum weight to the duck decoy;
   an anchor weight; and
   a decoy cord connected between the pendulum weight and the anchor weight wherein the pendulum weight has a lighter-in-weight proximal end attached to the connector and a heavier-in-weight, distal end.

2. The anchor system of claim 1, further including a swivel connected to the distal end of the pendulum weight between the pendulum weight and the decoy cord.

3. The anchor system of claim 2, wherein the connector is a clip configured to allow the pendulum weight to swing in an arc perpendicular to a longitudinal axis of the duck decoy.

4. A duck decoy, comprising:
   a decoy body;
   a monolithic pendulum weight;
   a connector configured to connect the pendulum weight to the decoy body;
   an anchor weight; and
   a decoy cord connected between the pendulum weight and the anchor weight wherein the pendulum weight has a lighter-in-weight proximal end attached to the connector and a heavier-in-weight distal end.

5. The duck decoy of claim 4, further including a swivel connected to the distal end of the pendulum weight between the pendulum weight and the decoy cord.

6. The duck decoy of claim 5, wherein the decoy body include a longitudinal axis extending from a front to a rear of the decoy body and the connector is a clip configured to allow the pendulum weight to swing in an arc perpendicular to a longitudinal axis of the duck decoy.

7. The duck decoy of claim 6, wherein the decoy body includes a bottom face and a bracket is carried on the bottom face.

8. The duck decoy of claim 7, wherein the connector is releasably secured to the bracket.

9. The duck decoy of claim 8, wherein the duck decoy is keel-free.

10. A duck decoy, comprising:
    a keel-free decoy body;
    a monolithic pendulum weight;
    a connector configured to connect the pendulum weight to the decoy body;
    an anchor weight; and
    a decoy cord connected between the pendulum weight and the anchor weight wherein the pendulum weight has a lighter-in-weight proximal end attached to the connector and a heavier-in-weight distal end.

11. The duck decoy of claim 10, further including a swivel connected to the distal end of the pendulum weight between the pendulum weight and the decoy cord.

12. The duck decoy of claim 11, wherein the decoy body includes a longitudinal axis extending from a front to a rear of the decoy body and the connector is a clip configured to allow the pendulum weight to swing in an arc perpendicular to the longitudinal axis of the decoy.

13. The duck decoy of claim 12, wherein the decoy body includes a bottom face and a bracket is carried on the bottom face.

14. The duck decoy of claim 13, wherein the connector is releasably secured to the bracket.

* * * * *